United States Patent [19]

Davis, Jr.

[11] 3,997,084

[45] * Dec. 14, 1976

[54] CAULKING GUN ADAPTER FOR AN ELECTRIC HAND DRILL

[76] Inventor: George B. Davis, Jr., 7512 Marbury Road, Bethesda, Md. 20014

[ * ] Notice: The portion of the term of this patent subsequent to Jan. 21, 1992, has been disclaimed.

[22] Filed: Sept. 8, 1975

[21] Appl. No.: 611,548

Related U.S. Application Data

[63] Continuation-in-part of Ser. No. 446,961, Feb. 28, 1974, Pat. No. 3,913,399.

[52] U.S. Cl. .............................. 222/326; 222/333; 222/390
[51] Int. Cl.² .......................................... B67D 5/46
[58] Field of Search .................. 222/333, 325–327, 222/390; 74/424.8 A; 64/30 R, 30 A, 30 C; 173/146

[56] References Cited

UNITED STATES PATENTS

| | | | |
|---|---|---|---|
| 647,765 | 4/1900 | Schulz | 74/424.8 A X |
| 686,391 | 11/1901 | Cox | 74/424.8 A |
| 1,829,789 | 11/1931 | Dammeyer | 222/333 |
| 2,294,745 | 9/1942 | Goetz | 74/424.8 A |
| 3,635,378 | 1/1972 | DeHart | 222/333 |
| 3,741,527 | 6/1973 | Dahl | 64/30 A X |
| 3,913,799 | 10/1975 | Davis, Jr. | 222/390 X |

Primary Examiner—Drayton E. Hoffman
Assistant Examiner—Charles A. Marmor

[57] ABSTRACT

This invention relates generally to caulking apparatus and particularly to a caulking gun attachment for an electric hand drill that is intended for securing to the drill body and drivably connected therewith whereafter upon operation of the drill, a caulk driving piston is forced through the caulk retaining receptacle of the gun in a manner to force caulking from the gun with considerable force and at a continuous and easy-to-control flow. Further, the gun includes a slipping clutch and an adjustment for allowing manual adjustment of the slipping point of the clutch thereby to selectively regulate the pressure and flow rate of the caulk being dispensed. Additionally, the gun includes a quick disengagement mechanism for freeing the piston from the drive train of the mechanism to allow the caulk driving piston to be manually moved in either direction through the gun.

18 Claims, 5 Drawing Figures

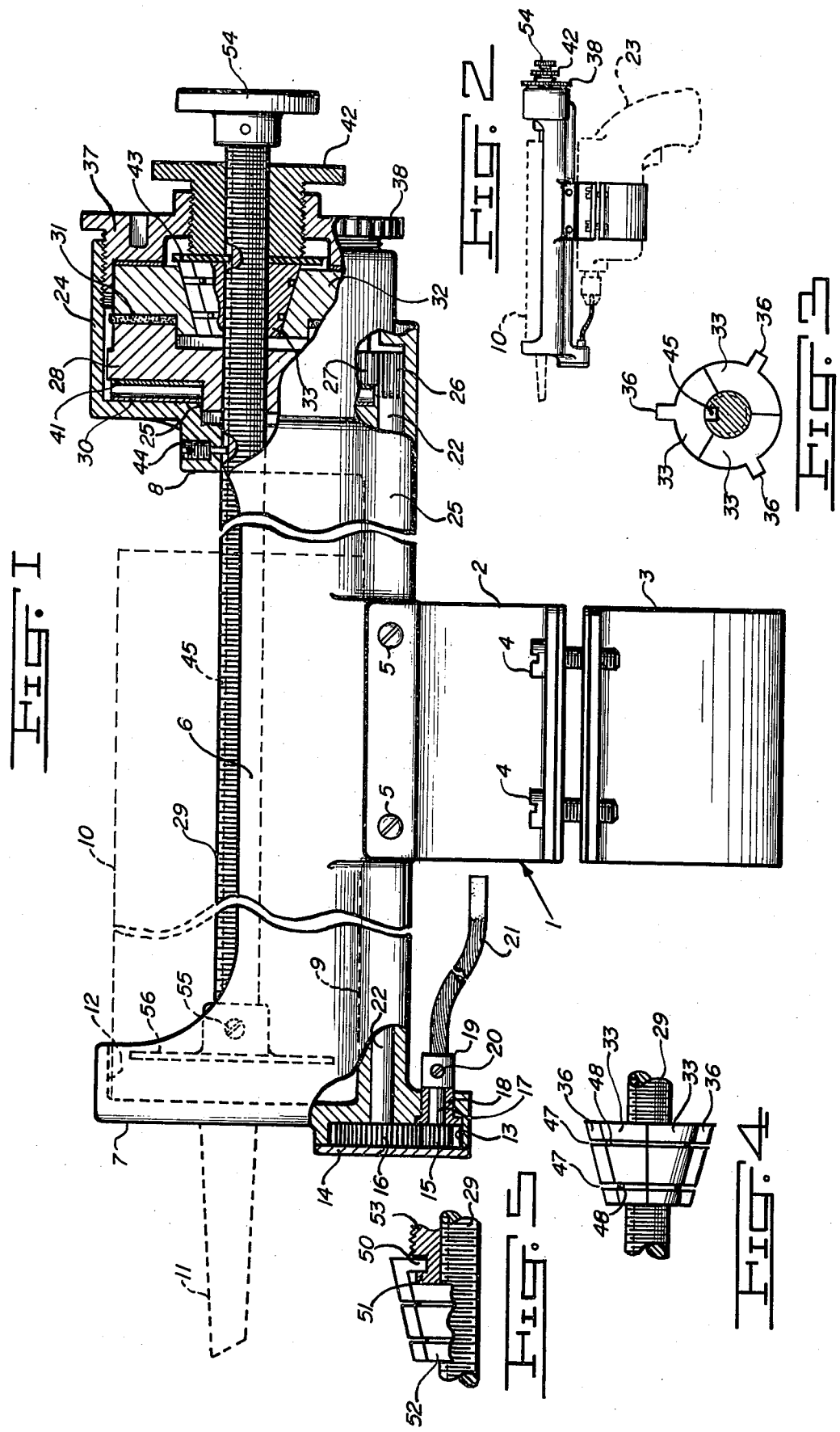

CAULKING GUN ADAPTER FOR AN ELECTRIC HAND DRILL

This application is a continuation in part of application Ser. No. 446,961 filed Feb. 28, 1974 and now U.S. Pat. No. 3,913,399 issued Oct. 21, 1975.

Caulking guns are well known in the art and are designed to dispense caulking from a caulk-retaining receptacle by way of a tubular-like projection or nozzle that serves to direct the caulking from the receptacle and into the particular crack or crevice to be filled. The caulking gun may be so formed as to include a refillable caulk-retaining receptacle or to receive therein a caulkfilled disposable cartridge, depending upon the particular design of the gun. With such caulking apparatus, a movable piston is forced through the receptacle to drive the caulking therein from the nozzle of the gun.

While electrically powered guns are known in the art, generally, with inexpensive guns, the piston thereof is driven through the gun by variously constructed hand-operated leverage mechanisms which serve to multiply the force applied to more easily urge the piston through the gun. It is well known, however, that even with the mechanical advantage offered by such force multiplying mechanisms, the effort required to drive caulking from a caulking gun is considerable and frequently beyond the gripping capability of many, particularly the aged or those crippled with arthritis or the like, yet in many instances, the very livelihood of such individuals with trades such as painters, boatmen and general home repair men, depend upon operating such caulking guns.

It is the primary object of the present invention to provide an inexpensive caulking gun attachment for a conventional electric hand drill wherein the drill will operate to provide the necessary power required to force caulking from the gun nozzle and to permit even a child to dispense caulking of the most viscous composition from the gun under high pressure and at a continuously easy-to-control flow.

A further object is to provide a caulking gun attachment for an electric hand drill wherein a slippable clutch mechanism within the drive train of the device may be selectively regulated as to the degree of clutch-slip to control the flow rate and pressure at which caulking is dispensed from the gun.

An additional object is to provide a caulking gun attachment for an electric drill wherein the drive train, connecting the drill with the piston of the gun, may be interrupted in a manner to free the piston of the drive linkage allowing manual movement of the piston through the gun.

A further object is to provide a caulking gun attachment for an electric hand drill wherein the clutch adjusting means is separately operated from the piston freeing mechanism of the gun.

Another object is to provide a caulking gun attachment for an electric hand drill wherein the design of the gun is such that substantially all parts thereof may be molded from plastic for lightness with the slipping clutch mechanism of the device operating to prevent overloading and possible damage to the plastic mechanism by the forceful stopping or overloading of the piston during operation of the drill.

Other objects are to provide a caulking gun attachment for an electric hand drill that is light in weight, rugged in structure, easy to clean, and inexpensive to manufacture.

Additional objects and advantages of the present device will become apparent when referring to the accompanying drawings wherein:

FIG. 1 is a plan view partly in elevation and partly cutaway in a manner disclosing the mechanism of the device.

FIG. 2 is a plan view of the caulking gun as mounted upon an electric hand drill in the manner the device will be used in service.

FIG. 3 is an end view in elevation of the segmented nut used in the device for driving the piston through the gun.

FIG. 4 is a side view in elevation of the segmented nut showing the grooves about the nut and arrangement of the ring-springs therein for holding the nut segments positioned.

FIG. 5 is a fragmentary cross-sectional view of an alternate form of the devise wherein the nut is maintained as a loosely fitting part of the clamp screw of the mechanism.

Referring now to the drawings and particularly to FIG. 1 wherein is shown the caulking gun of the present invention as including a clamping bracket of which the sections 2 and 3 thereof provide means for securing the gun to the body of a conventional electric hand drill 23, FIG. 2, and by means of which the mechanism of the gun is driven. These clamping members 2 and 3 are preferably lined with a suitable resilient material such as rubber or plastic, not shown, that offers a more positive frictional bond between the drill and gun as screws 4 within the bracket are tightened when securing the gun to the drill.

Fastened to the bracket as by self-taping screws 5 is the gun body member 6 that is preferably formed as a one-piece plastic molding. Centrally disposed between the end sections 7 and 8, is a craddle-like receptacle 9 wherein is received a caulk filled cartridge 10 with the caulking therein to be dispensed from the nozzle portion 11 thereof during operation of the gun. When resting within the receptacle 9, the forward end of the cartridge is retained in position by means of an annular inward extending flange 12 formed as an integral part of the section 7.

Molded within the forward end section 7, is a gear housing 13 wherein is enclosed, by cover 14, a pair of gears 15 and 16 that provide the forward part of the speed reducing drive train of the device. Extending rearward from gear 15 is a shaft section 17 so disposed as to journal within a preoiled bearing 18 preferably pressed within the housing to the position shown. The bearing 18 is so formed that the ends thereof extend slightly beyond the edges of the housing to provide a thrust-bearing surfuse for the gear 15 and sleeve 19 secured over the shaft 17 as by set screw 20.

Secured as by crimping within the sleeve 19, is a length of flexible shaft 21 by means of which the gun is drivably coupled with an electric hand drill with the shaft being clamped within the jaws of the drill chuck as the gun is mounted thereon, as shown in FIG. 2. The flexible nature of shaft 21, permitting out-of-line coupling of the gun with the various sizes and shapes of drills with which the gun may be used in service.

Leveling of the gun with respect to the drill may be accomplished by means of suitable leveling screws, not shown, and threaded into and extending from the gun body between the clamping bracket members 2 with the screws being adjustable into or out of the gun body to tilt the gun forward or backward as required to bring the axises of the gun and drill into proper alignment as the gun is clamped to the drill.

Extending rearward from gear 16, is a drive shaft 22 that operates to apply rotary motion from the forward drive train portion of the device to the piston driving mechanism disposed within the rear housing 24. The shaft 22, as it extends from gear 16, passes through and bearings within a closely fitting tubular guide molded within a stiffening rib 25 formed along the lower edge of the housing as shown with the gear section 26 upon the shaft meshing in driving relation with a gear 27 provided about the outer periphery of a clutch member 28 disposed for rotation within the rear housing 24. The clutch member 28 is designed for fitting closely about the caulk driving piston 29 of the gun but movable axially thereover As clutch member 28 is rotated by the driven shaft 22 with rotary motion from this member being communicated, by way of a frictional clutch disk 31, to a piston driving member 32 that is drivably connected with the piston by way of a threaded segmented nut 33 of which the internal threads thereof mesh with those upon the piston 29. The arrangement provides that any rotary motion of the drive member 32, will effect movement of the piston axially through the gun and against the caulking within the cartridge 10. The rate of movement of the piston with respect to the rotary speed of the clutch member 28, is determined by the degree of slip between the clutch member and drive member 32 at their bearing surfaces against the frictional clutch disk 31.

The segmented nut 33, as retained within the drive member 31, is tapered in configeration, as shown in FIGS. 1 and 4, with each of the nut segments including extending flanges 36, FIG. 3, that mate in drive communicating relation, with similarly formed internal grooves provided therefor within the drive member 32. This structure provides that as nut 33 is forcefully driven into the conical recess within the drive member 32, the segments of the nut are compressed about the piston in such a manner that the threads of the nut positively engage, in driving relation, the threads upon the piston to effect forceful movement of the piston through the gun as rotary motion is applied to the drive member by way of the clutch mechanism and drive train during operation of the drill 23.

Threaded into the rear housing in a manner to close the housing, is a clutch adjustment ring 37 having thereon an extending flange 38 by means of which the ring may be manually rotated into and out of the housing. Inward movement of the ring, after engaging the drive member 32, operates to shift the drive member, the clutch disk 31 and clutch member 28 forward in a manner to compress an annular corrugated spring washer 30 interposed between the clutch member 28 and housing 24 to thereby selectively regulate the pressure applied to the faces of the clutch disk 31 and thusly the slipping point of the clutch. Suitably hardened steel washers 41 are disposed between the spring and clutch member 28. Similar washers should be positioned between the drive member 32 and clutch adjustment ring 37 to reduce the friction between these members as pressure is applied to the clutch.

Threaded within the clutch adjustment ring 37 in the manner shown, is a clamp screw 42 that is manually adjustable into engagment with the rear face of the segmented nut 33 and operates, when tightened against the nut, to force the nut into its confined position within the drive member 32. This operation clamps the segments of the nut in thread meshing and driving relation with the piston as hereinbefore described. A hardened steel washer 43 interpositioned between the nut 33 and clamp screw 42, serves as a thrust-bearing against which the nut bears as caulking is forcefully driven from the gun during forward movement of the piston.

Tang screw 44, threaded within the end section 8 of the gun as shown, is positioned to engage a longitudinal groove 45 within the piston and thereby to prevent rotation of the piston as the latter is driven through the gun by rotation of the nut and drive member 32. The thrust washer 43 includes a suitable tab that also extends into the groove 45 of the piston in a manner to prevent the washer rotating with the nut as the latter is rotated during operation of the gun.

Arranged within annular grooves 47 provided about the segmented nut 33, are ring springs 48, FIGS. 1 and 4, that serve to maintain the nut segments and threads thereof properly positioned axially with respect to each other while yieldably allowing separation of the nut segments from the threaded surface of the piston as the nut is drawn backward with the piston after loosening of the clamp screw 42 as will hereafter be more fully described.

Generally manual retraction of the piston is all that is required of the device, however, should it also be required that the piston be manually forced forward, a structure could be provided as shown FIG. 5. Herein each of the nut segments 52 include a depending flange 50 that locks behind an extending flange formed upon clamp screw 53. Such an arrangement permits the nut 52 to be forcefully moved back and forth with the clamp screw while being loosely maintained therewith by reason of the ring springs 48. With the nut thusly held by the clamp screw in its retracted position and free of its clamped relation with the drive member 32, the piston may now be manually forced forward through the segments of the nut as well as retracted therethrough, as hereinbefore described. To operate the gun the clamp screw 42 is first backed off to allow manual withdrawal of the piston 29 from the cartridge receptacle 9. Retraction of the piston is done by means of its handle portion 54. As the piston is drawn backward through the receptacle, the threads of the piston, normally in mesh with the internal threads of the nut 33, pulls the nut from its clamped position within the drive member 32 and outward against the retracted clamp screw 42. Upon movement of the nut sufficiently from its confines within the drive member 32 and against the clamp screw 42, the threads of the piston operate to cam the nut segments apart to allow slippage of the threads of the piston by the internal threads of the nut as the piston is in this manner quickly withdrawn from the cartridge receptacle portion of the gun. After insertion of a full cartridge, the clamp screw 42 is again tightened to drive the nut 33 back into the drive member 32 and into thread meshing relation about the threaded piston to again connect the piston with the drive train mechanism of the device. Any misalignment of the threads of the nut with those of the piston occurring at this time will be taken up by a slight shifting of the drive member and clutch member 28 against spring 30. Subsequent rotation of the clutch assembly by the drive mechanism, will cause the threaded nut segments to snap again into meshing relation with the threaded surface of the piston.

As the piston dispenses caulking from the cartridge to ultimately reach its extreme forward position or is otherwise restrained from movement, the clutch mechanism, as represented by the clutch disk 31 compressed between member 28 and 32 of the device, becomes operative to effect slippage in the drive train until current to the drill can be interrupted. The clutch mechanism by operating in this manner, prevents serious damage occurring to the gun or drive mechanism therein because of the distructive power developed at the low end of the drive by reason of the extensive back-gearing required of the device.

While herein is shown the clutch element 32 as a flat frictional disk, it is understood that here any suitable type clutch mechanism may be employed, such as a conical clutch.

For the reason the present device will be used with various types of drills having differing speeds and operating characteristics, the device provides for manual adjustment of the clutch as by the clutch adjustment ring 38 which by either threading into or out of the housing will effect a condition of continuous clutch slippage during operation of the gun thusly allowing the caulking to be dispensed from the gun at any selected pressure or rate as deemed satisfactory to the operator. Since the relating clutch surfaces are operating at relatively low speeds of only a few rpms, there will be comparatively little heat or wear of the clutch disk during operation of the gun.

While it is understood that sufficient tightening of the clamp-screw 42 will shift the drive member 32 forward and in effect vary the pressure upon the clutch face and thusly the yielding point of the clutch, such an arrangement for clutch adjustment requires that the clutch be adjusted after the insertion of each new cartridge within the gun even though the cartridge being used are of an identical type. By herein providing for separate clutch adjustment means, as by the ring screw 37, clutch slippage may once be adjusted for the particular type cartridge being used and at which setting the clutch will continue to operate even though the clamp screw 42 is repeatedly operated for inserting other cartridges into the gun.

The gun may be cleaned by loosening the set-screw 55 and removing the caulk driving plate 56 from the piston whereupon, the entire mechanism within the rear housing of the gun may be withdrawn for cleaning after removing the clutch adjustment ring 37.

While herein is shown one concept of the device suitable for dispensing caulking from a gun by power supplied from an electric hand drill, it is understood that various arrangments and modifications thereof may be resorted to without departing from the concept shown.

What I therefore claim and desire to cover by letters patent is:

1. A caulking gun attachment for an electric hand drill including in combination securing means for fastening said gun to the body of said drill, a receptacle fastened to said securing means for receiving therein a caulking cartridge having a caulking dispensing nozzle thereon, a threaded piston movable when driven through said cartridge to force the caulking within said cartridge from said nozzle, driving means for said piston including a threaded nut disposed about the threaded surface of said piston and operative when rotated to drive said piston through said cartridge, a speed reducing drive train disposed for connecting said drill with said nut and operative when activated by operation of said drill to effect rotation of said nut, fixed means engaging said piston and operative upon rotation of said nut by said drill to prevent rotation of said piston with said nut and slipping clutch means interposed in said speed reducing drive train between said drill and said nut and operative to vary selectively the rate of rotation of said nut upon a predetermined movement retarding force being applied to said piston during operation of said drill.

2. A caulking gun attachment for an electric hand drill as claimed in claim 1 wherein said gun includes means manually movable for adjusting selectively the slip of said clutch.

3. A caulking gun attachment for an electric hand drill including in combination securing means for fastening said gun to the body of said drill, a receptacle fastened to said securing means for receiving therein a caulking cartridge having a caulking dispensing nozzle thereon, a threaded piston movable when driven through said cartridge to force the caulking from said cartridge by way of said nozzle, driving means for said piston including a threaded segmented nut, clamping means for releasably clamping the segments of said nut about the threaded surface of said piston with said nut being operative when clamped about the threaded surface of said piston and rotated, to effect movement of said piston through said cartridge, a speed reducing drive train disposed for connecting said drill with said nut and operative when activated by operation of said drill to effect rotation of said nut, fixed means engaging said piston and operative upon rotation of said nut by said drill to prevent rotation of said piston with said nut and slipping clutch means interposed in said speed reducing drive train between said drill and said nut and operative to vary selectively the rate of rotation of said nut upon a predetermined movement retarding force being applied to said piston during operation of said drill.

4. A caulking gun attachment for an electric hand drill as claimed in claim 3 wherein said gun includes means manually movable for adjusting selectively the slip of said clutch.

5. A caulking gun as claimed in claim 3 wherein said segmented nut is tapered in configuration and clamped about said piston by being driven by a part of said clamping means into a tapered recess forming another part of said clamping means and included as a part of said drive train.

6. A caulking gun as claimed in claim 5 wherein the reduced end of said tapered nut is pointed in the direction the piston is driven by said driving train when forcing caulking from said receptacle.

7. A caulking gun as claimed in claim 5 wherein between said tapered nut and said tapered recess are disposed interlocking drive communicating surfaces.

8. A caulking gun as claimed in claim 3 wherein said segmented nut is comprised of at least three segments.

9. A caulking gun attachment for an electric hand drill including in combination, fastening means for securing said gun to the body of the drill, a receptable secured to said fastening means for receiving therein a caulking cartridge having a caulking dispensing nozzle thereon, a threaded piston movable when driven through said cartridge to force caulking within said cartridge from said nozzle, drive means for said piston including a drive train to be driven by said drill, a tapered segmented nut threadedly engaging the threads of said piston with the decreasing tapered end of said nut directed toward the caulk driving end of said piston, a conical recess forming a part of said driving train and disposed about said tapered nut, drive communicating surfaces disposed between said tapered nut and said conical recess, clamping means for forcing said tapered nut in the driven direction of said piston and into said conical recess to effect driving communication between said nut and said driving train by means of said drive communicating surfaces and slipping cluth means interposed in said speed reducing drive train between said drill and said nut and operative to vary selectively the rate of rotation of said not upon a predetermined movement retarding force being applied to said piston during operation of said drill.

10. A caulking gun attachment for an electric hand drill as claimed in claim 9 wherein said gun includes means manually movable for adjusting selectively the slip of said clutch.

11. A caulking gun attachment for an electric hand drill as claimed in claim 9 wherein means are provided for securing said clamping means to said tapered segmented nut for axial movement therewith but with said clamping means being free for independent rotation with respect to said tapered nut.

12. A caulking gun attachment for an electric hand drill including in combination, securing means for fastening said gun to the body of said drill, a receptacle fastened to said securing means for receiving therein a caulking cartridge having a caulking dispensing nozzle thereon, a threaded piston movable when driven through said cartridge to force the caulking from said cartridge by way of said nozzle, driving means for said piston including a threaded segmented nut disposed about the threaded surface of said piston, a speed reducing drive train disposed for connecting said drill with said nut and operative when activated by operation of said drill to affect rotation of said nut, clamping means forming at least a part of said drive train for releasably clamping the segments of said nut about the threaded surface of said piston with said nut being operative when clamped about the threaded surface of said piston and rotated to effect movement of said piston through said cartridge, fixed means engaging said piston and operative upon rotation of said nut by said drill to prevent rotation of said piston with said nut and slippable clutch means disposed in said drive train between said drill and nut and operative upon a predetermined movement arresting pressure being applied to said piston to effect predetermined changes in the rate of rotation of said nut.

13. A caulking gun attachment for an electric hand drill including in combination fastening means for securing said gun to the body of the drill, a receptacle secured to said fastening means for receiving therein a caulking cartridge having a caulking dispensing nozzle thereon, a threaded piston movable when drive through said cartridge to force caulking within said cartridge from said nozzle, drive means for said piston including a speed reducing drive train to be driven by said drill, a tapered segmented nut disposed for threadedly engaging the threaded surface of said piston with the decreasing tapered end of said nut directed toward the caulk driving end of said piston, a tapered recess forming a part of said drive train and disposed about said tapered nut, drive communicating surfaces disposed between said tapered nut and said tapered recess, means movable for forcing said tapered nut in the driven direction of said piston and into said tapered recess to effect the clamping of the segments of said nut about the threaded surface of said piston whereby upon rotation of said nut by way of said drive train said piston is driven through said receptacle, means movable for releasing and maintaining said nut from its clamped position within said recess for permitting manual movement of said piston through said nut and slippable clutch means disposed in said speed reducing drive train to effect selective degrees of slip in said drive train between said drill and nut responsive to the amplitude of a movement retarding force being applied to said piston during operation of said drill.

14. A caulking gun attachment for an electric hand drill including in combination securing means for fastening said gun to the body of said drill, a receptacle fastened to said securing means for receiving therein a caulking cartridge having a caulking dispensing nozzle thereon, a threaded piston movable when driven through said cartridge to force the caulking from the cartridge by way of said nozzle, means for drivably connecting said piston with said drill including a speed reducing drive train, a threaded segmented nut disposed about said piston and operative when clamped about the threaded surface of said piston and rotated by way of said drive train to effect movement of said piston through said receptable, clamping means for clamping the segments of said nut about the threaded surface of said piston with at least a part of said clamping means forming a part of said drive train, means movable for effecting the release of said clamping means from said nut for freeing said piston for allowing manual movement of the piston through said receptable and adjustable slippable clutch means disposed in said drive train to effect selective degress of slip in said drive train between said drill and nut responsive to the amplitude of a movement retarding force being applied to said piston during operation of said drill.

15. In a caulking gun to be driven by a power source including a receptacle for receiving therein a caulking filled cartridge having a caulk dispensing nozzle thereon, a threaded piston disposed for movement through said receptacle for forcing caulking from said cartridge by way of said nozzle, driving means for said piston including a drive train for drivably connecting said piston with said power source, a threaded segmented nut disposed about said piston and operable when clamped about the threaded surface of said piston and rotated to effect movement of said piston through said receptacle, clamping means for releasably clamping the segments of said nut about the threaded surface of said piston with at least a part of said clamping means being a part of said drive train, means movable for effecting the release of said nut from said clamping means for allowing manual movement of said piston through said receptacle and adjustable slippable clutch means disposed in said drive train between said nut and power source to effect selective degrees of slip in said drive train responsive to the amplitude of a movement retarding force applied to said piston during operation of said power source.

16. A caulking gun as claimed in claim 15 wherein said power source is an electric hand drill.

17. A caulking gun as claimed in claim 16 wherein said caulking receptacle includes means for securing said caulking gun to said drill.

18. A caulking gun as claimed in claim 17 including means for drivably connecting said driving train with said drill.

* * * * *